United States Patent [19]
Gulick

[11] 3,842,690
[45] Oct. 22, 1974

[54] AUTOMATICALLY DISENGAGEABLE MANUAL CONTROL
[75] Inventor: Ronald A. Gulick, Sugarland, Tex.
[73] Assignee: Research Engineering Company, Houston, Tex.
[22] Filed: May 10, 1973
[21] Appl. No.: 359,113

[52] U.S. Cl................ 74/625, 74/424.8 A, 251/14
[51] Int. Cl............................................. F16h 25/00
[58] Field of Search .......... 74/625, 424.8 A; 251/14

[56] References Cited
UNITED STATES PATENTS

| | | | |
|---|---|---|---|
| 3,007,487 | 11/1961 | Adams | 251/14 |
| 3,012,448 | 12/1961 | Abraham | 74/625 |
| 3,168,841 | 2/1965 | Caldwell et al. | 74/625 |
| 3,539,101 | 11/1970 | Huber | 251/14 |
| 3,628,397 | 12/1971 | Sheesley | 74/625 |
| 3,736,802 | 6/1973 | Kibler | 74/424.8 A |

*Primary Examiner*—Samuel Scott
*Assistant Examiner*—Wesley S. Ratliff, Jr.
*Attorney, Agent, or Firm*—Robert W. B. Dickerson

[57] ABSTRACT

Control system which may be manually operable, on the absence of pressure, said manual portion being automatically disengaged on pressure being provided to the system.

10 Claims, 5 Drawing Figures

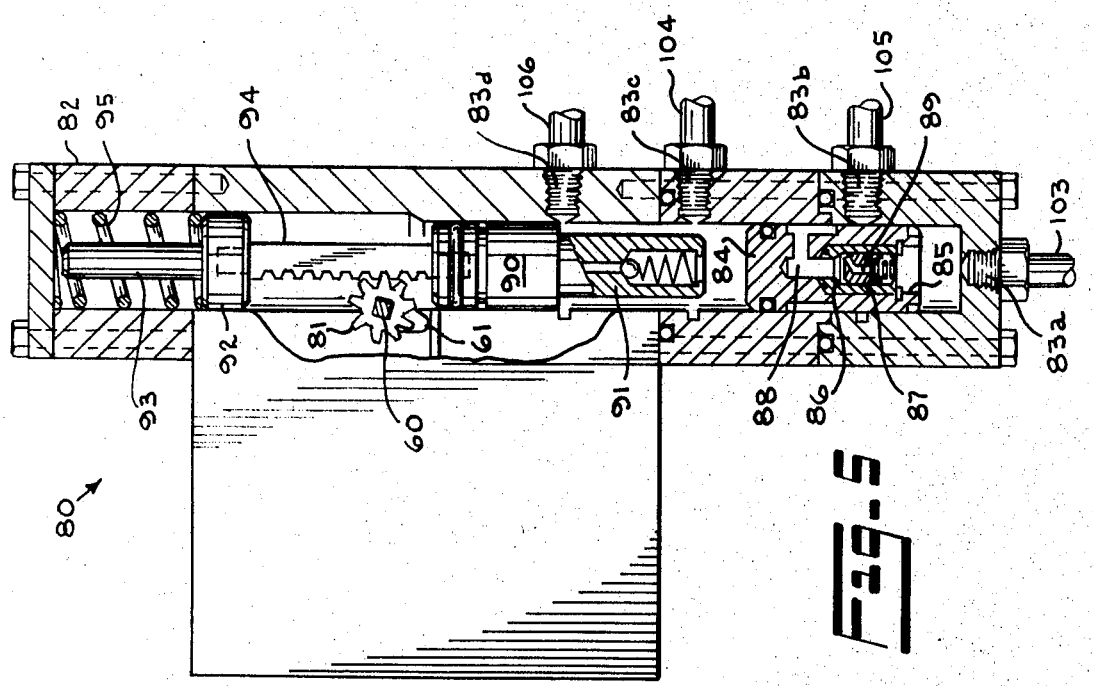
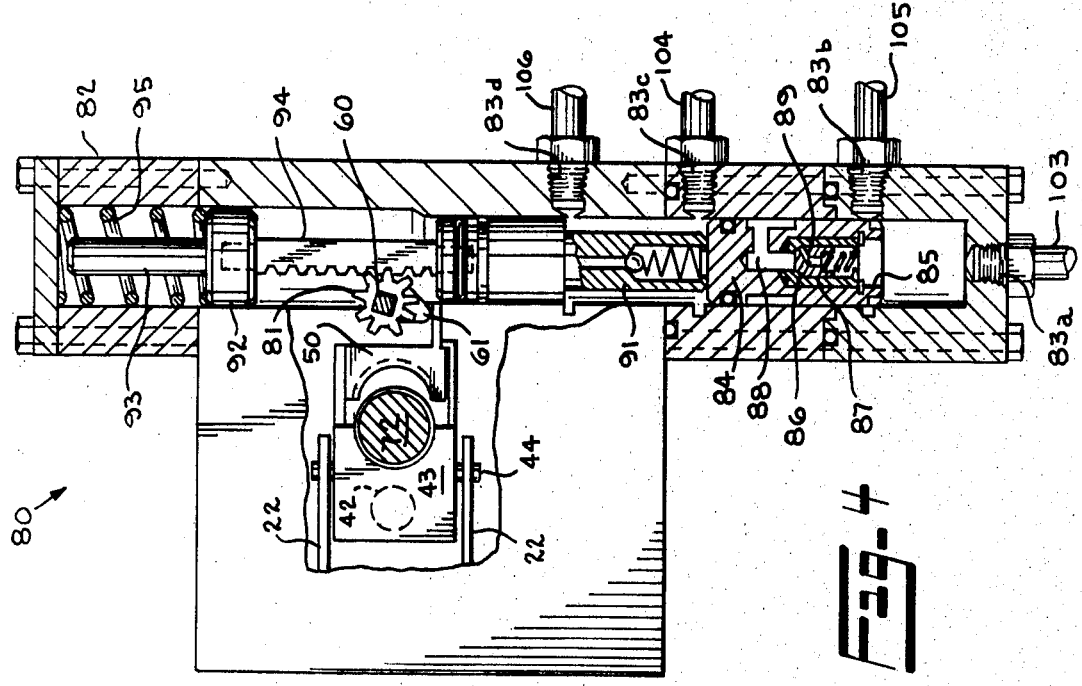

AUTOMATICALLY DISENGAGEABLE MANUAL CONTROL

BACKGROUND OF THE INVENTION

In many areas of industrial operation, it is desirable to be able to control a device from a position remoted from the device itself. Various types of control mechanisms have been used, including those electrically, pneumatically or hydraulically operated. It has further proved beneficial to have back-up mechanisms, in the event of a power or pressure failure. Such back-ups often have been of the manual type. While the particular device controlled may vary over a broad range of industrial applications, for illustration purposes herein such device may be referred to as a valve actuator. It has been found desirable that the back-up mechanism should not be operable when the prime source of power to the control mechanism is available. Otherwise, there may be danger both to the mechanism and to nearby personnel. It is to the problem of economically solving this need for a safe and efficient mating of a prime and back-up control device, that this invention is directed.

SUMMARY OF THE INVENTION

Assuming that the ultimate operation to be controlled is the opening and closing of a valve, which may govern flow through a conduit, a valve actuator would normally be provided to cause such opening and closing. The valve stem may be rotated by a yoke mechanism, such as shown in U.S. Pat. No. 3,677,108, although the control system presented herein has utility with many other actuators and other controlled devices.

In pneumatic or hydraulic actuators, a source of pressurized fluid (liquid, air, or gas), deemed the prime mover, would be connected to the actuator, to cause, on command or automatically, valve opening or closing. A back-up system, which may be manually or otherwise controlled, is also provided to operate the actuator. This back-up, for example, may cause yoke rotation, and thereby valve opening or closing. However, means are provided for automatically disengaging the back-up, when the prime mover is adequately pressurized and linked to the actuator. The disengagement mechanism may include a partial nut member, types of such members being illustrated in U.S. Pat. Nos. 3,677,108 and 3,730,008.

DESCRIPTION OF THE DRAWINGS

FIGS. 2, 4, and 5 are sections taken along line 2—2 of FIG. 1, illustrating the piston member in different positions, parts of the actuator being broken away.

DESCRIPTION OF A PREFERRED EMBODIMENT

Figure 2:
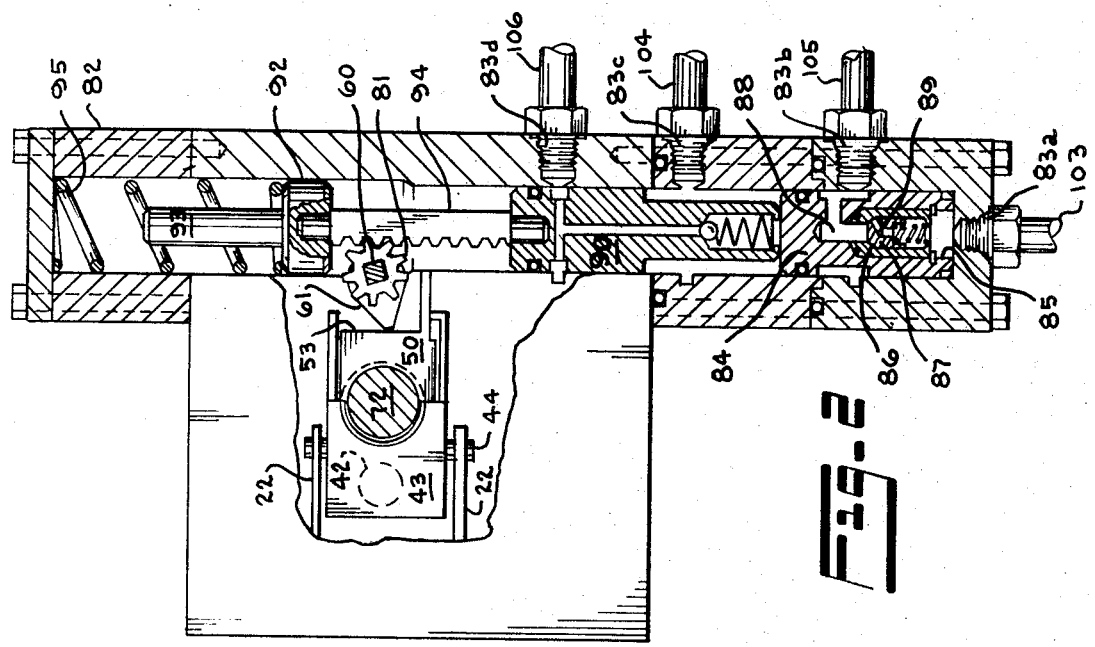

Looking at the drawings, an actuator is indicated generally by the numeral 10. The actuator would normally cause a controlled device, such as a valve stem, to perform a function, such as opening or closing a valve. The actuator may be of the oscillatable yoke type, or of other types where motion by one member is converted into further motion by another member.

A rotatable valve stem 11, is shown to be keyed to opening 21 of yoke 20. Such a yoke would be mounted in bearings (not shown) provided the actuator housing. The yoke may have arms 22, which would have slots 23 therein.

Figure 3:
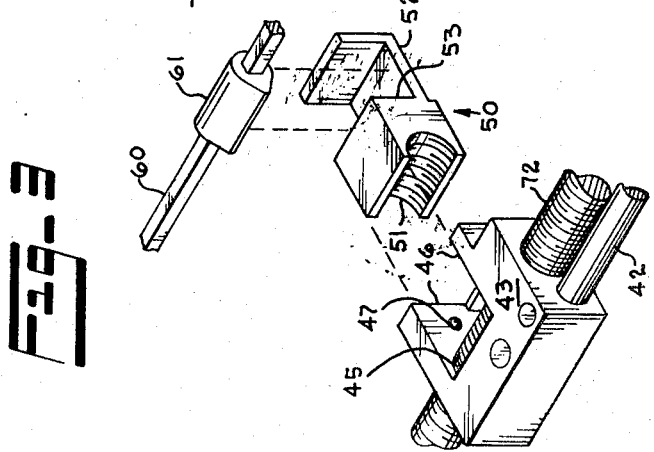
FIG. 3 is an exploded perspective of parts of the engagement mechanism.

Attached to one end of the actuator housing, and in communication with the interior thereof, is power cylinder 40. Within the cylinder is a reciprocating piston (not shown), and piston rod 42 attached at one end to said piston. The other end of the piston rod is shown pinned to retainer member 43. This generally U-shaped retainer carries a roller 44, portions of which ride in slots 23 of the yoke arms. Thereby, the yoke, and valve stem keyed thereto, is rotated or oscillated as a function of the reciprocal movement of the piston and piston rod 42. Upwardly of actuator 10 is a handwheel 70, having rod or shaft 71 depending therefrom. The wheel may be proximate to said housing, or substantially removed therefrom, as for example in the instance of an underwater actuator location. In any case, a portion of shaft 71 extends within the actuator housing, this portion 72 being threaded substantially throughout. Retainer 43 has unthreaded apertures 45 for slidably receiving threaded portion 72 or shaft 71. Depending legs 46 of the retainer have aligned perforations at 47. FIG. 3 especially illustrates a split nut 50, having a threaded portion 51, and a depending channel portion 52, with a shoulder 53. A square, or rectangular shaft 60, slidably carries a cam member 61. When assembled, the split nut is positioned between legs 46 of retainer 43, with threaded portion 51 removably engageable with the threads of shaft 71. Shaft 60 passes through apertures 47 in legs 46 of the retainer, with the cam 61 nesting within channel portion 52 of the split nut, so that on being rotated so as to abut against shoulder 53, the split nut may be caused to mate with threaded portion 72 of shaft 71. Thus far, the operation described is quite similar to that of said U.S. Pat. No. 3,677,108.

Figure 1:
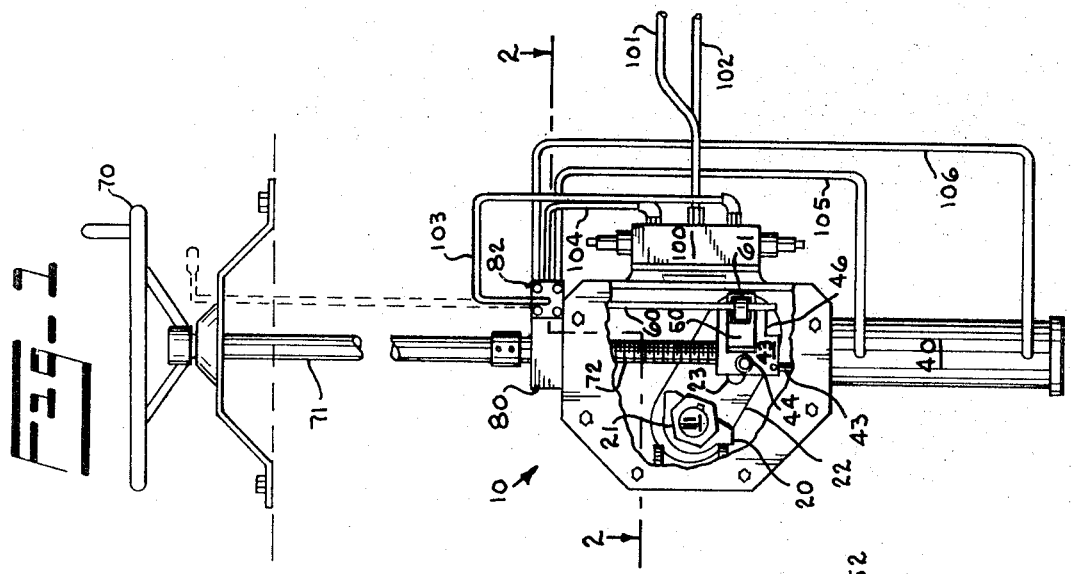
FIG. 1 is broken side elevation of an actuator and manually controlled back-up.

Consider now the structure of FIGS. 2, 4, and 5. Shaft 60, towards the end removed from cam 61, carries a pinion gear 81, said gear being within the housing of a sequencing assembly, generally illustrated at 80. Bearings for said shaft may be provided said housing, on opposite sides of gear 81. The phantom lines of FIG. 1 illustrate that shaft 60 may be extended, for manual engagement or disengagement of the split nut with threaded portion 72 of shaft 71, but the structure described hereinafter is primarily intended for automatic control of such functions. In the latter case, the end of shaft 60 removed from cam 61 would be rotatably mounted in one of said aforementioned bearings. The assembly 80 includes a hollow cylinder portion 82 having a cavity therein, with four entry ports thereinto 83A, 83B, 83C and 83D. Moving upwardly from the bottom of FIGS. 2, 4 and 5, there is a piston element 84. This piston includes a tap 85 at one end which forms a seating shoulder 86. Within this tap, a check valve 87 is movably positioned, said check valve depicted as being spring-urged toward engagement with shoulder 86. Piston 84 includes a passageway 88 leading from its side into communication with the cavity formed by tap 85. The check valve 87 includes a passageway 89, which passageway has one end blocked when said check valve is seated against shoulder 86, said one end being in communication with passageway 88 when the check valve is not so seated. The other end of the check valve passageway 89 is open to the interior cavity of member 84.

Removably abutting one end of piston 84 is a nipple extension 91 of a piston body 90. Member 90 also includes a check valve (not numbered) which, like member 87, yieldably blocks entrance to a passageway (also unnumbered). The lower end of nipple extension 91 includes an opening (not shown) communicating between the annulus surrounding the nipple and the interior tap containing the check valve. This piston body is linked to a further piston body 92 which also includes a depending nipple extension 93. The two piston bodies are linked by a rack 94, the combination being deemed a piston assembly. The teeth of the rack are in mesh with the teeth of pinion 81. Surrounding extension 93, and seated between piston body 92 and the interior wall of cylinder 82, is spring 95. This spring tends to urge the piston assembly away from the adjacent end of cylinder 82.

An actuator control valve is only generally illustrated in FIG. 1 by numeral 100. This control valve is connected to a source (not shown) of fluid under pressure, by conduits 101, 102. The interior mechanism of this control valve is not important to this invention, there being numerous existing means for accomplishing its purpose. For example, there may be a spool (not depicted) therewithin whereby incoming fluid will enter through line 101, and be directed to the sequencing assembly 80, as hereinafter described, while fluid would be exhausted through line 102. Obviously, such a spool may be caused to shift, thereby reversing the roles of such lines. There also are connections between control valve 100 and assembly 80. Conduit 103 leads from valve 100 to port 83A, while conduit 104 connects the control valve with port 83C. In addition, the sequencing assembly is in fluid communication with power cylinder 40. Conduit 105 leads from port 83B to one side of the piston within cylinder 40, while conduit 106 leads from port 83D to the other side of said piston.

Consider now the operation of the system. Assume a sufficient supply of fluid under pressure from the outside source to move through line 101 to actuator control valve 100. Mechanism interior of valve 100 would open communication with sequencing assembly 80, through conduit 103 to port 83A. The incoming fluid would force piston 84 upwardly (FIG. 2), along with the piston assembly thereabove. Note that passage of fluid through opening 89 is blocked by virtue of check valve 87 being seated against shoulder 86. As the piston assembly moves, rack 94 causes counter clockwise rotation of pinion 81, thereby removing the engagement of split nut 61 from threaded portion 72 of shaft 71. This is effected by virtue of rotating cam 61 out of forceful engagement with shoulder 53 of the split nut (see FIG. 4). Thus the manual control system is automatically disengaged prior to piston 84 moving upwardly enough to expose port 83B to the pressurized fluid, i.e., a built-in time lag. When port 83B is uncovered, fluid may exit therethrough, through conduit 105 into power cylinder 40, acting on the piston therein, causing it, through piston rod 42 to move retainer 43, thereby rotating yoke 20 and its keyed valve stem 11, having the desired effect on the controlled valve. During the same operation, fluid on the opposite side of the piston within power cylinder 40 would be exhausted from cylinder 40 through conduit 106 and port 83D into the cylinder 82 cavity, out port 83C, through conduit 104 to actuator control valve 100, out conduit 102 to the outside supply reservoir. Continuing with the system being adequately pressurized, assume that it is desired to rotate valve stem 11 in the opposite direction. Fluid from the outside reservoir would follow the course of conduit 102, into control valve 100, out conduit 104, and into assembly 80 through port 83C. On entering the cavity within cylinder 82, the fluid would retain the piston assembly (pistons 90, 92 and rack 94) in the up position of FIG. 5, force piston 84 downwardly, as in the same Figure, exit through port 83D and conduit 106 to power cylinder 40, where its piston would move upwardly, causing the reverse movement of that previously described of piston rod 42, retainer 43, yoke 20 and valve stem 11. Fluid exhausted from the upper side of the piston within power cylinder 40 would course through conduit 105, and port 83B. Since piston 84 would be fully down, as in FIG. 2, opening 88 would be in registry with port 83B. Thus, pressure would unseat check valve 87, permitting such fluid to pass around shoulder 86, through check valve opening 89, out port 83A, through conduit 103, to control valve 100, out conduit 101 to the supply reservoir. Thus, whenever the system is pressurized, the manual control system is automatically disengaged.

Now, assume that for some reason, pressure is removed. The action of spring 95 would force the piston assembly, and piston 84 to the position shown in FIG. 2. The rack 94, by engagement with pinion 81 would rotate it clockwise, so that cam 61 would exert a force against shoulder 53 of split nut 50, causing its threaded portion 51 to mate with the threads of shaft portion 72. Rotation of handwheel 70, and its attached shaft 71, by virtue of the aforementioned threaded engagement, will cause linear motion, in either desired direction of retainer 43, which causes rotation of yoke 20 and the linked valve stem 11. Note that split nut 50 rides along with retainer 43, between its legs 46, and is held in mating engagement with threaded portion 72 of shaft 71, since the cam 61 is slidingly engaged with shaft 60 (which, as mentioned, fixedly carries pinion 81 at one end). Thus, in the absence of pressure, the back-up system is automatically engaged, and disengaged on pressure being available. Also note that on pressure returning, the time lag present, permits the back-up to be disengaged prior to the operation of the pressure controlled system.

During manual operation, any fluid present within power cylinder 40, may be exhausted along one of the following paths, depending on the direction of piston movement therein: A) conduit 105, port 83B, passageway 88, unseat check valve 87, passageway 89, port 83A, conduit 103, valve 100, to the reservoir through conduit 101; or B) conduit 106, port 83D, through the passageway of piston 90, unseat the check valve, through the opening at the lower end of extension 91, port 83C, conduit 104, valve 100, conduit 102 to the reservoir.

Although only a single embodiment has been described, it should be apparent that numerous modifications, including reversing conduit arrangements, may be made by one skilled in the art, without departing from the spirit of the invention, the scope of which is intended to be limited only by the following claims:

1. In a device for controlling a further member, wherein said device includes an external power supply for exercising said control and also includes back-up means for exercising said control, the addition of means for automatically engaging and disengaging said back-up means as a function of said external power supply to said device, said automatic means including:

means releasably coupling said back-up means to said further member, said coupling means including;
linearly movable piston assembly, means for causing movement of a linkage means, said movement causing means being movable with said piston assembly, and linkage means including a gear and a cam member, said cam member being so positioned as to cause said engagement or disengagement as a function of the position of said gear.

2. The device of claim 1 and including means for causing said piston assembly to assume one position when power is operatively supplied to said further member, and to assume a second position when said power is not so supplied.

3. The device of claim 2 wherein said position assuming means includes a spring device for biasing said piston assembly toward said second position.

4. The device of claim 2 and including time lag means for permitting limited movement of said piston assembly, on said external power changing from inoperative to operative, prior to said coupling means being uncoupled.

5. The device of claim 3 and including time lag means for permitting limited movement of said piston assembly, on said external power changing from inoperative to operative, prior to said coupling means being uncoupled.

6. In a device for controlling a further member, wherein said device includes an external power supply for exercising said control and also includes back-up means for exercising said control, the combination of:

means for automatically engaging and disengaging said back-up means as a function of said external power supply to said device, said automatic means including;
linearly movable piston assembly, means for biasing said piston assembly toward a first position, means for causing said piston assembly to move toward a second position when said power is operatively supplied by said power supply, and
means linking said piston assembly to said back-up means, said linking means including a gear operated cam, said cam member being so positioned as to cause said engagement or disengagement as a function of the position of said gear.

7. The device of claim 6 wherein said back-up means includes a rotatable threaded shaft slidably received by a traveling member which traveling member is adapted to cause movement of said further member, and said linking means gear is rotatably engaged with a portion of said piston assembly.

8. The device of claim 7 wherein the portion of said piston assembly engaged with said gear is a toothed portion.

9. The device of claim 6 and including time lag means for permitting limited movement of said piston assembly, on said external power changing from inoperative to operative, prior to back-up means being disengaged.

10. The device of claim 8 and including a yoke for causing rotation of said further member, a further piston containing power cylinder, said further piston being linked to said traveling member, means for selectively causing said power supply to act on opposite faces of said piston, and time lag means for permitting limited movement of said piston assembly on said external power changing from inoperative to operative yet prior to said back-up means being disengaged.

* * * * *